(12) United States Patent
Pfeilschifter et al.

(10) Patent No.: US 11,413,975 B2
(45) Date of Patent: Aug. 16, 2022

(54) VEHICLE ELECTRICAL SYSTEM HAVING A STORED ENERGY SOURCE AND HAVING CHARGING TERMINALS

(71) Applicant: VITESCO TECHNOLOGIES GMBH, Hannover (DE)

(72) Inventors: Franz Pfeilschifter, Munich (DE); Felix Mueller, Munich (DE); Manuel Brunner, Munich (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/276,935

(22) PCT Filed: Aug. 27, 2019

(86) PCT No.: PCT/EP2019/072818
§ 371 (c)(1),
(2) Date: Mar. 17, 2021

(87) PCT Pub. No.: WO2020/057912
PCT Pub. Date: Mar. 26, 2020

(65) Prior Publication Data
US 2022/0032790 A1 Feb. 3, 2022

(30) Foreign Application Priority Data
Sep. 17, 2018 (DE) .......................... 102018215769.3

(51) Int. Cl.
*B60L 11/18* (2006.01)
*H02M 3/335* (2006.01)
*B60L 53/12* (2019.01)
*H02J 50/10* (2016.01)
*B60L 50/60* (2019.01)

(52) U.S. Cl.
CPC ............... *B60L 53/12* (2019.02); *B60L 50/60* (2019.02); *H02J 50/10* (2016.02); *H02J 2310/48* (2020.01)

(58) Field of Classification Search
CPC ..... B60L 53/122; B60L 53/124; B60L 53/126
See application file for complete search history.

(56) References Cited

U.S. PATENT DOCUMENTS

| 5,132,894 A | 7/1992 | Rozman et al. |
| 2014/0062394 A1 | 3/2014 | Khan et al. |
| 2018/0250999 A1* | 9/2018 | Golin ....................... B60L 53/38 |
| 2018/0290545 A1* | 10/2018 | Elshaer .................... B60L 53/14 |

(Continued)

FOREIGN PATENT DOCUMENTS

| DE | 102009033185 A1 | 11/2010 |
| DE | 102011005911 A1 | 9/2012 |

(Continued)

*Primary Examiner* — Jared Fureman
*Assistant Examiner* — Esayas G Yeshaw
(74) *Attorney, Agent, or Firm* — Laurence A. Greenberg; Werner H. Stemer; Ralph E. Locher

(57) ABSTRACT

A vehicle electrical system is equipped with an energy store, a DC charging terminal and an AC charging terminal. The vehicle electrical system also has a power low-pass filter. The power low-pass filter connects a first section of the vehicle electrical system to a second section of the vehicle electrical system. The DC charging terminal is provided in the second section. The AC charging terminal is provided in the first section.

14 Claims, 1 Drawing Sheet

(56) References Cited

U.S. PATENT DOCUMENTS

2019/0089171 A1* 3/2019 Fischer .................. H02J 7/025
2020/0070679 A1* 3/2020 Wang ...................... B60L 58/12

FOREIGN PATENT DOCUMENTS

| DE | 102016008265 A1 | 2/2017 |
| DE | 102015219590 A1 | 4/2017 |
| DE | 102017008840 A1 | 3/2018 |
| DE | 202018001504 U1 | 4/2018 |
| EP | 2657063 A1 | 10/2013 |

* cited by examiner

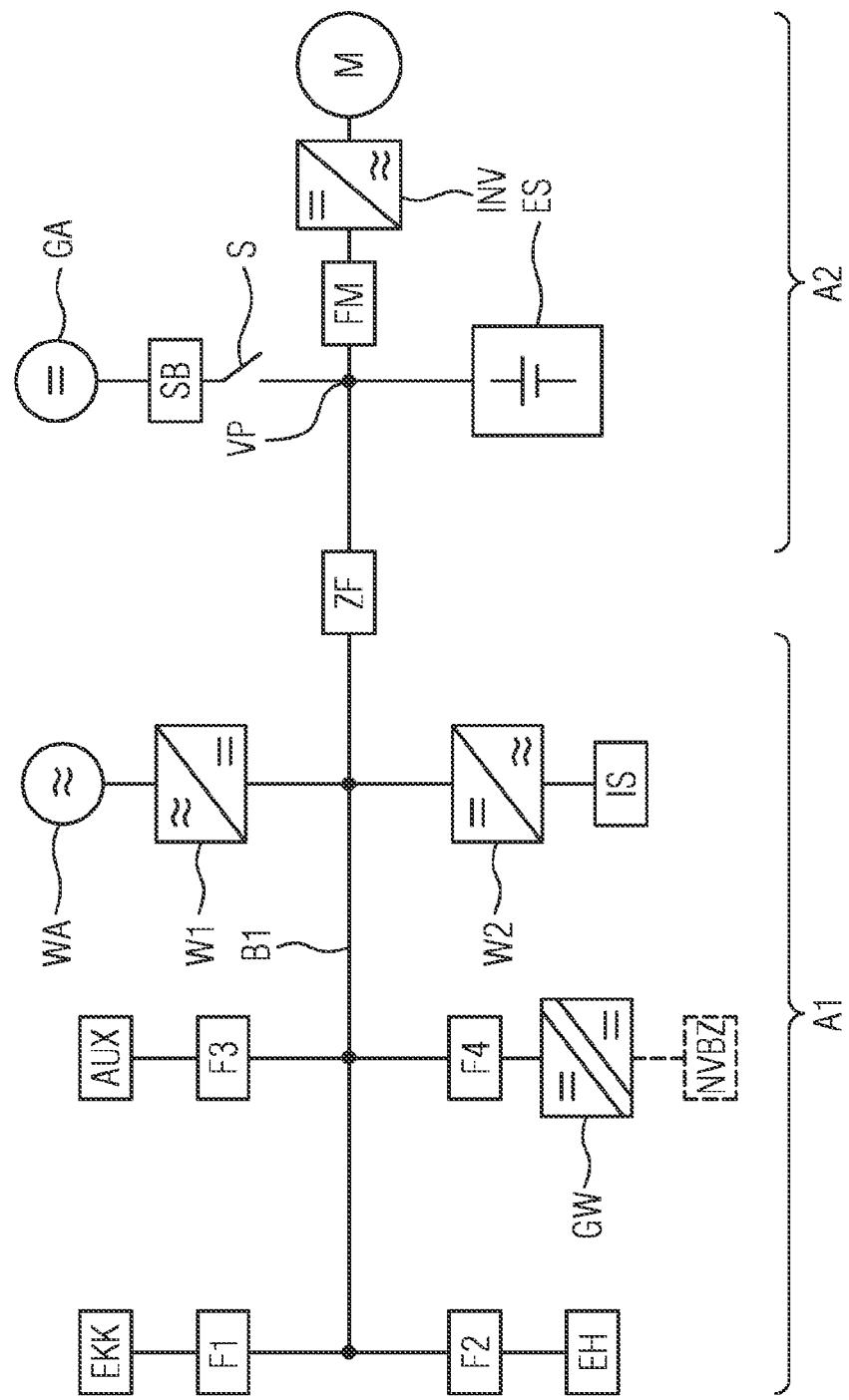

VEHICLE ELECTRICAL SYSTEM HAVING A STORED ENERGY SOURCE AND HAVING CHARGING TERMINALS

BACKGROUND OF THE INVENTION

Field of the Invention

Vehicles with an electric drive, that is to say vehicles that drive purely electrically and hybrid vehicles, have an electrical energy store. In order to be able to charge said electrical energy store with external means, such vehicles must have a charging terminal. Said terminal is provided in order to be able to introduce energy for charging into the vehicle and therefore also into the energy store. Direct current or alternating current can be used here. Vehicles with such charging terminals are also referred to as "plug-in vehicles".

In addition to the charging circuits (for connecting the charging terminals), an electrical system of such a vehicle also has other components that operate in a clocked manner. The clocked switching results in interference in the electrical system. On the one hand, in the context of electromagnetic compatibility, the aim is to prevent the interference from interfering with other components during operation, and on the other hand, the intention is to avoid interference being emitted from the vehicle electrical system. EMC filters are used for this purpose.

SUMMARY OF THE INVENTION

Due to the large number of components that can be connected to a vehicle electrical system, numerous filters are also required to connect the corresponding components in order, on the one hand, to suppress the interference emanating from the components and, on the other hand, used to prevent interference with the components. Since the filters are associated with significant costs, one object is to show one possibility by way of which the costs for the EMC-compatible design of the vehicle electrical system can be reduced.

This object is achieved by the vehicle electrical system of according to the independent claim. Further features, embodiments, properties and advantages emerge from the dependent claims.

A vehicle electrical system in which a power low-pass filter is used as a central filter is proposed. The central filter connects a first section of the electrical system to a second section, wherein the energy store is provided in the second section and an AC charging terminal is provided in the first section. Further components are therefore also provided in the first section, with the result that the central filter serves as a common filter for these components and for the AC charging terminal. An electrical energy store of the vehicle electrical system is situated in the second section, that is to say starting from the power low-pass filter beyond the AC charging terminal. Said energy store is, in particular, a storage battery such as a high-voltage storage battery, for example a traction storage battery.

A DC charging terminal is also provided in the second section, which, in particular, is connected to the energy store in the second electrical system without a further filter element (that is to say without a filter). Said DC charging terminal is preferably connected to the energy store without a further converter. Furthermore, an inverter and an electric machine are also provided in the second section and are connected to the energy store and also to the power low-pass filter via an additional filter. Interference that arises in the inverter is therefore filtered by the additional filter and also by the power low-pass filter, and is therefore significantly attenuated until it enters the first section.

A vehicle electrical system having an energy store is therefore described, wherein the vehicle electrical system also has a DC charging terminal and an AC charging terminal. The vehicle electrical system also has a power low-pass filter (as central filter). Said power low-pass filter connects a first section of the vehicle electrical system to a second section of the vehicle electrical system. The two sections have the same nominal voltage and are, in particular, high-voltage vehicle electrical systems. The DC charging terminal is provided in the second section and the AC charging terminal is provided in the first section. Switching pulses in an AC rectifier, which connects the AC terminal to the power low-pass filter, therefore only reach the energy storage device attenuated through the power low-pass filter. The first section is, in particular, a (preferably completely) shielded section. The DC terminal, the connection between the DC terminal and a connection point to which the central filter is also connected are, in particular, unshielded.

As mentioned, the vehicle electrical system preferably has at least one further consumer. Said consumers can correspond to the components mentioned above. The at least one further consumer is connected to the power low-pass filter via an additional filter, wherein the additional filter is associated with the consumer. In the case of several consumers, an additional filter associated only with said consumer connects the consumer to the power low-pass filter. In other words, in the first section there is a supply bus to which the at least one additional consumer is connected via an associated additional filter. Said supply bus is connected to the power low-pass filter.

The power low-pass filter has a central position within the vehicle electrical system. The power low-pass filter is also referred to as the central filter. The power low-pass filter connects the supply bus (or the first section) to the second section of the vehicle electrical system.

The at least one consumer can be provided in the first section. However, as an alternative or in combination with this, a consumer can also be provided in the second section. At least one electrical heating element is considered as a consumer in the first section. For example, the heating element can be a heating element for an electrically heatable catalytic converter (of an exhaust gas purification device), or it can be an electrical heater that for instance is thermally connected to the air-conditioning system and/or to a cooling circuit for components of the vehicle. As an alternative or in combination with this, the at least one consumer can have an electric air-conditioning compressor.

The consumers are, in particular, clocked consumers and therefore have at least one power actuator that clocks the current for setting the power, for example by means of pulse-width modulation. The consumer can also be connected to the power low-pass filter via a clocked power actuator or via a clocked converter (as well as via the additional filter). The additional filter, which is associated with the respective consumer, can be adapted to the frequency or to the interference spectrum that the consumer emits through said clocking. As a consumer, in particular in the first section, as an alternative or additionally a DC voltage converter can be provided, in particular a DC voltage converter that connects a low-voltage electrical system branch to the rest of the vehicle electrical system, in particular to a part of the vehicle electrical system that is designed as a high-voltage electrical system. The prefix "low-voltage" denotes elements and parts whose nominal voltage is below 60 volts, for example a nominal voltage of 12 volts, 13 volts, 14 volts, 24 volts or 48 volts. Said DC voltage converter may be a galvanically isolating DC voltage converter, which is designed, in particular, as a step-down converter.

At least one consumer in the second section can be designed as an electric machine and/or as an inverter. In this case, the actual consumer is the electric machine, while the inverter can be referred to as an actuator that operates in a clocked manner. The at least one consumer, which is preferably provided in the second section, is therefore designed as an electric machine. Said electric machine is connected to the associated additional filter via the inverter. The additional filter therefore connects the inverter to the central filter. One possibility is to consider the at least one consumer, which is preferably provided in the second section, as an electric drive that has an electric machine and an inverter. As a consumer, said drive is connected to the power low-pass filter via the associated additional filter. As mentioned, the inverter in this case forms the clocked operating actuator. The consumer is the electric machine. The inverter can be designed so as to be bidirectional in order to enable energy to be recuperated by means of the electric machine. In order to optimize costs, the additional filters can be designed with lower attenuation or attenuating power than the power low-pass filter. The power low-pass filter can exhibit coupling attenuation at least 10 dB, 15 dB or 20 dB greater than that of the additional filter. This can exist, in particular, for frequencies below 10 MHz, for example for frequencies below 0.3 MHz, for frequencies below 1.8 MHz or even for frequencies below 100 kHz. In particular, the additional filters on the one hand and the power low-pass filter on the other hand can be different classes of the CISPR 25:2016 standard. In this case, the power low-pass filter can be designed according to class 5 (of the standard mentioned). The additional filter can be designed as a class 3 filter (of the standard mentioned) (and therefore permit greater interference than the power low-pass filter). In this case, the specified interference limits can relate to operation at nominal power or at maximum power of the consumers. By designing the additional filters according to class 3 (and not according to class 5), costs can be saved, with the central filter as a class 5 filter connecting the components of the first section to the second section (in which the energy store is located). As a result, the same class 5 filter is used by a large number of consumers, with two filter stages resulting for the consumers with an additional filter, namely the additional filter and the power low-pass filter. Attenuation or coupling attenuation is the term used to describe the attenuation between two ports of the filter. As an alternative, the attenuation can also relate to the transmission path of a port of the filter and the environment, that is to say the attenuation of signals that are emitted to be assigned to the filter. The term "class" refers to the CISPR 25:2016 standard and relates, in particular, to the class definitions according to "HV limits for conducted voltage measurements at shielded power supply devices" or "Examples of limits for conducted disturbances—Voltage method" or "Examples of limits for conducted disturbances—Current probe method".

The vehicle electrical system can also have an induction charging interface. Said induction charging interface can be provided in the first section.

The induction charging interface can be connected to an induction charging rectifier or connected via said induction charging rectifier to the power low-pass filter. The induction charging rectifier can be connected to the power low-pass filter without a filter. "Without a filter" is used herein to refer to connections that have little or no attenuation, with low attenuation also including attenuations that are achieved by filters of classes 2 and 1 of the cited standard. In other words, the term "without a filter" may mean that the connection in question does not achieve the attenuation of a filter according to class 3, 4 or 5 of the CISPR 25:2016 standard, but provides (weaker) attenuation for interchangeable components. Since, depending on the frequency, even lines have a filter effect due to their inductance coating, the term "without a filter" is not intended to mean that the connection in question is completely free of inductances.

The AC charging terminal is preferably connected to an AC rectifier. Said AC rectifier connects the AC charging terminal to the power low-pass filter. The AC rectifier is preferably connected to the power low-pass filter without a filter. The term "without a filter" is to be understood as mentioned above.

The DC charging terminal can be connected to the power low-pass filter without a converter and, in particular, can also be connected to the energy store without a converter. The DC charging terminal is preferably connected to the power low-pass filter without a filter. The term "without a filter" can correspond, in particular, to the definition mentioned above.

The energy store is connected to the power low-pass filter. In particular, the connection is without a filter. In this case, too, the term "without a filter" has already been defined above as a property.

The energy store is preferably designed as a traction storage battery, in particular as a lithium battery. The DC charging terminal can be connected to the power low-pass filter via a transient/surge protector (burst and surge filter). Since such components have an attenuation below the attenuation of filters in accordance with class 3, 4 or 5 of the CISPR 25:2016 standard, a connection that includes the protector in question is to be regarded as not having a filter.

A controller is preferably also provided and is set up to operate the AC rectifier of the AC charging terminal and the induction charging rectifier of the induction charging interface alternately or to provide both in the inactive state. In particular, such a controller is designed to suppress activation of the induction charging rectifier when the AC rectifier of the AC charging terminal is active, and to prevent activation of the AC rectifier of the AC charging terminal when the induction charging rectifier or the induction charging interface is active. The central filter, that is to say the power low-pass filter, is designed, in particular, for a nominal or maximum current of not more than 70 A, in particular of essentially 66 or 65 A. The additional filters are preferably designed for a nominal or maximum current of not more than 50%, 40%, 35%, 33% or 30% based on the current rating of the power low-pass filter.

BRIEF DESCRIPTION OF THE DRAWING

FIG. 1 shows a schematic illustration of an embodiment of a vehicle electrical system.

DETAILED DESCRIPTION OF THE INVENTION

FIG. 1 shows an exemplary embodiment of an electrical system described here having a first section A1 and a second section A2. The two sections A1, A2 are connected to one another via a central filter ZF, which is referred to as a power low-pass filter. The first section A1 of the vehicle electrical system includes consumers such as a heater of an electrically heatable catalytic converter system EH, an electrical heating element EKK of a cooling circuit and a further consumer AUX, which can be designed, for example, as an electric air-conditioning compressor. Said consumers are connected to the central filter ZF via respective additional filters F1 to F3. An electrical system branch NVBZ for secondary consumers is connected to the power low-pass filter ZF via a DC voltage converter GW and a further additional filter F4. The electrical system branch NVBZ and the DC voltage converter GW can be considered to be further consumers connected to the power low-pass filter ZF via an additional filter F4. The DC voltage converter GW is preferably galvanically isolating. The electrical system branch NVBZ is designed for a nominal voltage of 12 volts, for example. The DC voltage converter GW is set up to convert the nominal voltage in the first section A1, which is designed, for example, for high-voltage applications, for example for nominal voltages of at least 400 volts, 600 volts or 800 volts, so that the nominal voltage in the first section is greater than the nominal voltage of the electrical system branch NVBZ.

In the first section, an AC terminal WA and an induction charging interface IS are also illustrated. These are connected to the central filter ZV via a respective converter or rectifier. The AC charging terminal WA is connected to the central filter via the converter W1, wherein the converter W1 is designed as an AC rectifier, in particular as a controllable rectifier. The converter W1 can have a filter, the level of attenuation of which, however, is less than the attenuation of the filters F1 to F4, the filter FM (explained below) and the central filter ZF. The inductive charging interface is connected to the central filter via the induction charging rectifier W2, wherein the converter W2 is also designed as a clocked rectifier. The induction charging rectifier W2 can also be designed as a clocked rectifier and, in particular, have attenuating elements, the attenuating strength of which, however, is preferably less than the attenuation of the filters F1 to F4, the filter FM and, in particular, the power low-pass filter ZF.

The power low-pass filter ZV (which can also be referred to as central filter) connects the first section A1 to a second section A2. In said second section there is an energy store ES, in particular designed as a high-voltage storage battery. Said energy store is connected (essentially without a filter) to the power low-pass filter ZV. Furthermore, an electric drive, in particular an inverter INV and an electric machine M connected thereto, is provided in the second section A2. The inverter and the electric machine are connected to the power low-pass filter ZF via the additional filter FM. In this case, the inverter connects the electric machine to the power low-pass filter ZF via the additional filter FM. If interference is therefore generated in the inverter INV, it only passes through a total of three filter stages, for example to the electrical system branch NVBZ, namely via the filter stages FM, ZF, F4.

It should be noted that the central filter ZF produces a greater attenuation effect than the filter F4 and also than the filter FM. In general, the central filter ZF has greater attenuation than each of the additional filters F1 to F4 and FM.

In the section A2, the energy store ES is connected to the additional filter FM essentially without a filter. The energy store ES is also connected to the power low-pass filter ZF without a filter. The second section A2 of the illustrated vehicle electrical system also comprises a DC voltage terminal GA. Said DC charging terminal is connected to the power low-pass filter ZF via a surge and transient protector SB. Said connection comprises a switch S, which is used, for example, as a disconnecting switch, which can be opened, in particular in the event of a fault, or which is open when the vehicle is not being charged via the DC charging interface GA. It can be seen that the section A2 has a common connection point VP to which the battery ES and the power low-pass filter ZF are connected. The DC charging terminal GA is also connected to said connection point (via the transient and surge protector SB).

Furthermore, the electric machine or the inverter connected thereto is connected to the connection point VP via the additional filter.

The section A2 comprises a connection point or a supply bus B1 to which numerous consumers are connected via respective associated additional filters (F1 to F4). Furthermore, the AC charging terminal WA is connected (via the AC rectifier W1) to said supply bus B1 (corresponding to a voltage rail). In addition, the inductive charging interface IS is connected to said bus B1 via the relevant induction charging rectifier W2. The bus is also connected to the power low-pass filter ZF. Said power low-pass filter connects the bus B1 of the first section A1 to the connection point VP of the section A2. The bus B1 of the section A1 is characterized by the reference sign B1, the connection point of the section A2 by the reference sign VP.

In a specific embodiment, the additional filters, in particular the illustrated additional filters F1 to F4 and FM, are designed according to class 3 of the CISPR 25:2016 standard, while the power low-pass filter ZF is designed according to class 5 of said standard. In particular, the charging terminals of the section A1 are designed as shielded. The DC charging terminal GA, which can be designed as unshielded, is located in the section A2. The connections within the section A2 are preferably also designed as partially or completely shielded.

The invention claimed is:

1. A vehicle electrical system, comprising:
   an energy store;
   a DC charging terminal configured for connection to a source of DC current located externally from the vehicle;
   an AC charging terminal configured for connection to a source of AC current located externally from the vehicle;
   a power low-pass filter connecting a first section of the vehicle electrical system to a second section of the vehicle electrical system; and
   said DC charging terminal being disposed in said second section and said AC charging terminal being disposed in said first section.

2. The vehicle electrical system according to claim 1, further comprising:
   an additional filter; and
   at least one consumer connected to said power low-pass filter via said additional filter associated with said at least one consumer.

3. The vehicle electrical system according to claim 2, wherein said at least one consumer is disposed in said first section; and/or
   further comprising at least one further consumer disposed in said second section.

4. The vehicle electrical system according to claim 3, further comprising an inverter; and
   wherein said at least one consumer in said second section is an electric machine connected to said additional filter via said inverter.

5. The vehicle electrical system according to claim 2, wherein said power low-pass filter is for frequencies below 10 MHz and exhibits coupling attenuation at least 15 dB greater than that of said additional filter.

6. The vehicle electrical system according to claim 1, further comprising an induction charging interface disposed in said first section.

7. The vehicle electrical system according to claim 6, further comprising an induction charging rectifier connected to said power low-pass filter, said induction charging interface connected to said induction charging rectifier, wherein a filter is not used to connect said induction charging rectifier connected to said low-pass filter.

8. The vehicle electrical system according to claim 1, further comprising an AC rectifier connected to said power low-pass filter without a filter, said AC charging terminal is connected to said AC rectifier.

9. The vehicle electrical system according to claim 1, wherein said DC charging terminal is connected to said power low-pass filter without a filter.

10. The vehicle electrical system according to claim 1, wherein said energy store is connected to said power low-pass filter without a filter.

11. The vehicle electrical system according to claim 1, wherein said energy store is a traction storage battery.

12. The vehicle electrical system according to claim 1, wherein said first section of the vehicle electrical system includes a plurality of electrical consumers.

13. The vehicle electrical system according to claim 12, wherein at least one of said plurality of electrical consumers is selected from the group consisting of: an electrical heating element and an electric air-conditioning compressor.

14. The vehicle electrical system according to claim 1, further comprising a surge and transient protector connected between said DC charging terminal and said power low-pass filter.

\* \* \* \* \*